(12) United States Patent
Moseke

(10) Patent No.: US 9,755,359 B2
(45) Date of Patent: Sep. 5, 2017

(54) CONNECTOR PART COMPRISING A LOCKING ELEMENT WITH A SWITCH

(71) Applicant: PHOENIX CONTACT E-Mobility GmbH, Schieder-Schwalenberg (DE)

(72) Inventor: Dirk Moseke, Hoexter-Luechtringen (DE)

(73) Assignee: PHOENIX CONTACT E-MOBILITY GMBH, Schieder-Schwalenberg (DE)

( * ) Notice: Subject to any disclaimer, the term of this patent is extended or adjusted under 35 U.S.C. 154(b) by 0 days.

(21) Appl. No.: 15/239,845

(22) Filed: Aug. 18, 2016

(65) Prior Publication Data

US 2017/0054251 A1    Feb. 23, 2017

(30) Foreign Application Priority Data

Aug. 21, 2015   (DE) .................. 10 2015 113 875

(51) Int. Cl.
| | | |
|---|---|---|
| *H01R 29/00* | (2006.01) | |
| *H01R 13/627* | (2006.01) | |
| *H01R 13/70* | (2006.01) | |
| *H01R 43/00* | (2006.01) | |

(52) U.S. Cl.
CPC ....... *H01R 13/6275* (2013.01); *H01R 13/701* (2013.01); *H01R 43/002* (2013.01)

(58) Field of Classification Search
CPC ............................ H01R 13/701; H01R 13/703
USPC ............ 439/304, 352, 188, 911; 200/51 R
See application file for complete search history.

(56) References Cited

U.S. PATENT DOCUMENTS

| | | | | | |
|---|---|---|---|---|---|
| 4,575,595 | A | * | 3/1986 | Gill ........................ | H01H 9/20 200/50.3 |
| 4,774,399 | A | * | 9/1988 | Fujita .................... | G06K 7/006 235/441 |
| 5,478,250 | A | * | 12/1995 | Hoffman ............ | B60L 11/1818 220/3.8 |
| 5,584,715 | A | * | 12/1996 | Ehrenfels ............ | B60L 11/1818 439/222 |

(Continued)

FOREIGN PATENT DOCUMENTS

DE    19650099 C2    6/1997

*Primary Examiner* — Neil Abrams
(74) *Attorney, Agent, or Firm* — Leydig, Voit & Mayer, Ltd.

(57) ABSTRACT

A connector part to be connected to an associated mating connector part includes a housing having a plug-in portion that can be plugged into a mating plug-in portion of the mating connector part in an insertion direction and is connected to the mating plug-in portion when in a connection position. At least one electrical contact element is arranged on the plug-in portion, the at least one electrical contact element electrically contacting the mating connector part when in the connection position. A locking element is moveably arranged on the housing, the locking element interlocking the connector part with the mating connector part when in the connection position. The connector part includes a switch device with a switch portion that can be actuated when the locking element is moved to control a current flowing over the at least one contact element. An adjustment element is mounted on the locking element and is configured to be adjusted and to act on the switch when the locking element is moved a predetermined distance.

14 Claims, 5 Drawing Sheets

(56) References Cited

U.S. PATENT DOCUMENTS

| | | | | |
|---|---|---|---|---|
| 5,627,448 A * | 5/1997 | Okada | B60L 3/12 | 320/109 |
| 5,637,977 A * | 6/1997 | Saito | B60L 11/1818 | 320/109 |
| 5,711,558 A * | 1/1998 | Woody | B60L 11/1818 | 292/144 |
| 5,820,395 A * | 10/1998 | Hashizawa | B60L 11/1818 | 439/271 |
| 5,865,640 A * | 2/1999 | Tadokoro | G06F 1/1616 | 439/347 |
| 6,123,569 A * | 9/2000 | Fukushima | B60L 11/1818 | 439/310 |
| 8,206,171 B2 * | 6/2012 | Osawa | H01R 13/502 | 439/352 |
| 8,550,833 B2 * | 10/2013 | Martin | H01R 13/6395 | 439/310 |
| 8,562,370 B2 * | 10/2013 | Takagi | H01R 13/6275 | 439/345 |
| 8,573,994 B2 * | 11/2013 | Kiko | B60L 3/0069 | 320/109 |
| 8,616,909 B2 * | 12/2013 | Kurumizawa | E05B 83/00 | 320/109 |
| 8,678,847 B2 * | 3/2014 | Inoue | B60L 11/1818 | 439/352 |
| 8,690,591 B2 * | 4/2014 | Charnesky | B60L 11/1818 | 191/12.4 |
| 8,827,729 B2 * | 9/2014 | Gunreben | H01R 13/658 | 439/188 |
| 8,932,072 B2 * | 1/2015 | Tamaki | H01R 13/6272 | 439/345 |
| 9,039,437 B2 * | 5/2015 | Kurumizawa | H01R 13/6397 | 439/352 |
| 9,088,104 B2 * | 7/2015 | Kahara | H01R 13/6397 | |
| 9,106,018 B2 * | 8/2015 | Ohmura | H01R 13/639 | |
| 9,401,566 B2 * | 7/2016 | Boeck | H01R 13/52 | |
| 9,509,095 B2 * | 11/2016 | Ohmura | H01R 13/639 | |
| 9,533,586 B2 * | 1/2017 | Kahara | B60L 11/1818 | |
| 2011/0281447 A1 * | 11/2011 | Kano | B60L 11/1818 | 439/133 |
| 2013/0337669 A1 * | 12/2013 | Najera | B60L 11/1818 | 439/133 |
| 2014/0184158 A1 * | 7/2014 | Osawa | H01R 13/639 | 320/109 |
| 2014/0329400 A1 * | 11/2014 | Kakizaki | B60L 11/1818 | 439/304 |
| 2017/0047679 A1 * | 2/2017 | Garth | B60L 11/1818 | |

* cited by examiner

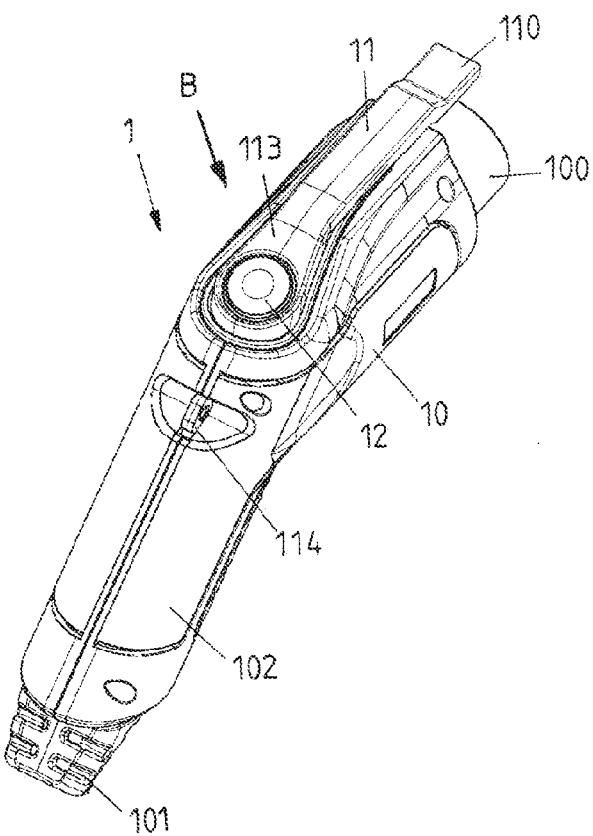
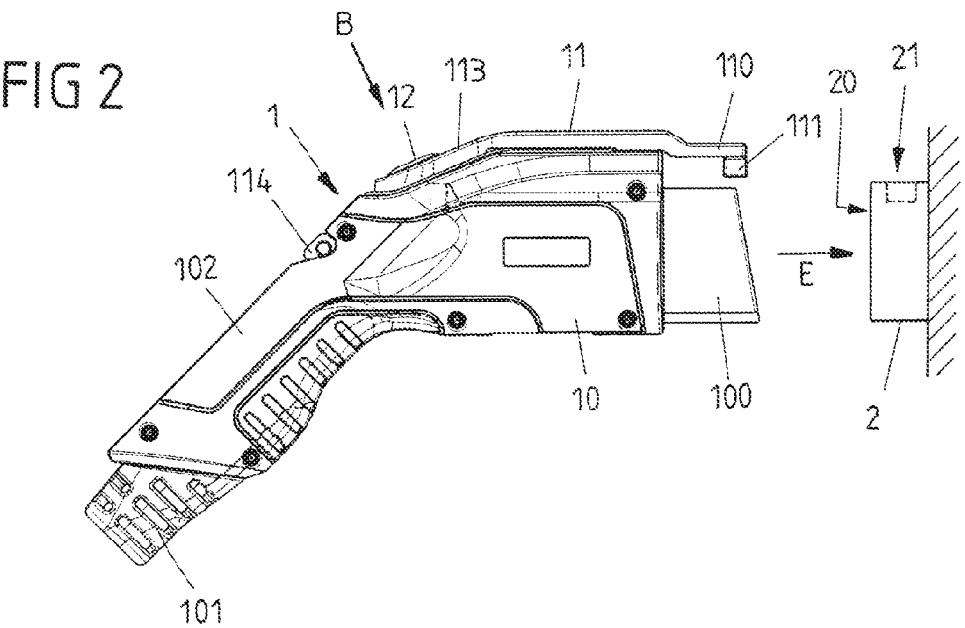

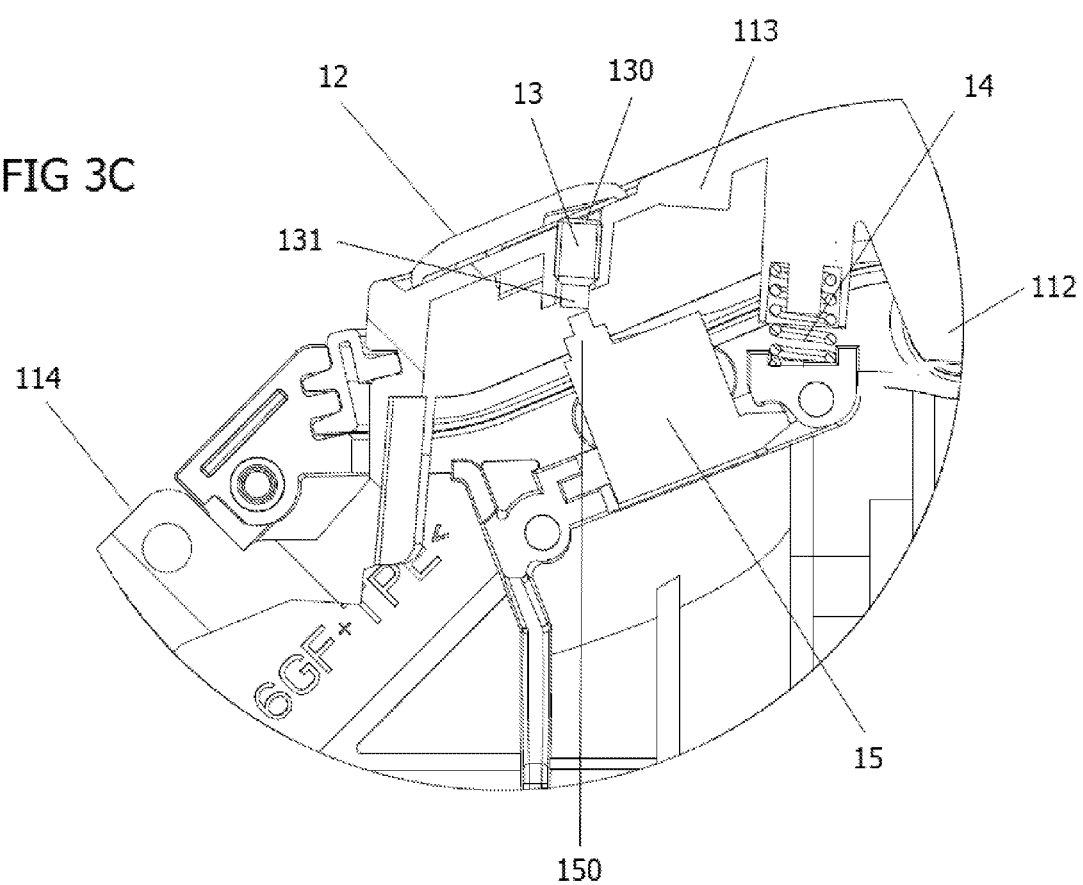

CONNECTOR PART COMPRISING A LOCKING ELEMENT WITH A SWITCH

CROSS-REFERENCE TO PRIOR APPLICATION

Priority is claimed to German Patent Application No. DE 10 2015 113 875.1, filed on Aug. 21, 2015, the entire disclosure of which is hereby incorporated by reference herein.

FIELD

The invention relates to a connector part to be connected to an associated mating connector part and to a method for calibrating a connector part to be connected to an associated mating connector part.

BACKGROUND

A connector part of this type can be designed, for example, as a charging plug for charging an electrically operated vehicle (also referred to as electric vehicle). In this context, this type of connector part can be used, for example, to transmit a charging current in the form of a direct current or an alternating current.

A connector part of this type comprises a housing having a plug-in portion which can be plugged into a mating plug-in portion of the mating connector part in an insertion direction and which is connected to the mating plug-in portion of the mating connector part when in a connection position. At least one electrical contact element is arranged on the plug-in portion and is connected to a mating contact on the mating connector part when the connector part and the mating connector part are connected. A locking element is moveably arranged on the housing and is used to interlock the connector part with the mating connector part when the connector part and the mating connector part are connected. A switch device is also provided and comprises a switch portion, which can be actuated when the locking element is moved, for controlling a current flowing over the at least one contact element.

In an electric vehicle charging plug known from DE 196 50 099 C2, a locking lever is pivotally arranged on a housing. When in a connection position, in which the charging plug is plugged into an associated charging socket, the locking lever locks the connection in such a way that the charging plug cannot be released from the charging socket without unlocking the locking lever. The aim of this is, in particular, to prevent the charging plug from being accidentally removed from the charging socket during a charging operation and thereby possibly interrupting a charging operation.

The charging plug in DE 196 50 099 C2 comprises a switch device in the form of a microswitch that is actuated when the locking lever is unlocked. The microswitch is connected to a control circuit, which controls the flow of current over contact elements of the charging plug depending on the locking position of the locking lever. If the locking lever is unlocked, a relay of the control circuit is opened, and so a flow of current is stopped.

In the charging plug in DE 196 50 099 C2, the locking lever acts on the microswitch. Generally, microswitches of this type have low tolerances in terms of the construction of their switching point, and so it must be ensured that the microswitch is actuated sufficiently reliably when the locking lever for unlocking is actuated. With existing component tolerances of the locking lever and the housing of the charging plug (which are produced as injection moulded plastics parts, for example), this may not be easy to ensure in some cases.

SUMMARY

A connector part to be connected to an associated mating connector part includes a housing having a plug-in portion that can be plugged into a mating plug-in portion of the mating connector part in an insertion direction and is connected to the mating plug-in portion when in a connection position. At least one electrical contact element is arranged on the plug-in portion, the at least one electrical contact element electrically contacting the mating connector part when in the connection position. A locking element is moveably arranged on the housing, the locking element interlocking the connector part with the mating connector part when in the connection position. The connector part includes a switch device with a switch portion that can be actuated when the locking element is moved to control a current flowing over the at least one contact element. An adjustment element is arranged on the locking element and can be adjusted relative to the locking element and act on the switch portion of the switch device when the locking element is moved.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 is a perspective view of a connector part in the form of a charging plug;

FIG. 2 is a side view of the connector part;

FIG. 3C is an enlarged partial view showing details of the sectional view according to FIG. 3B;

DETAILED DESCRIPTION

Figure 3A:
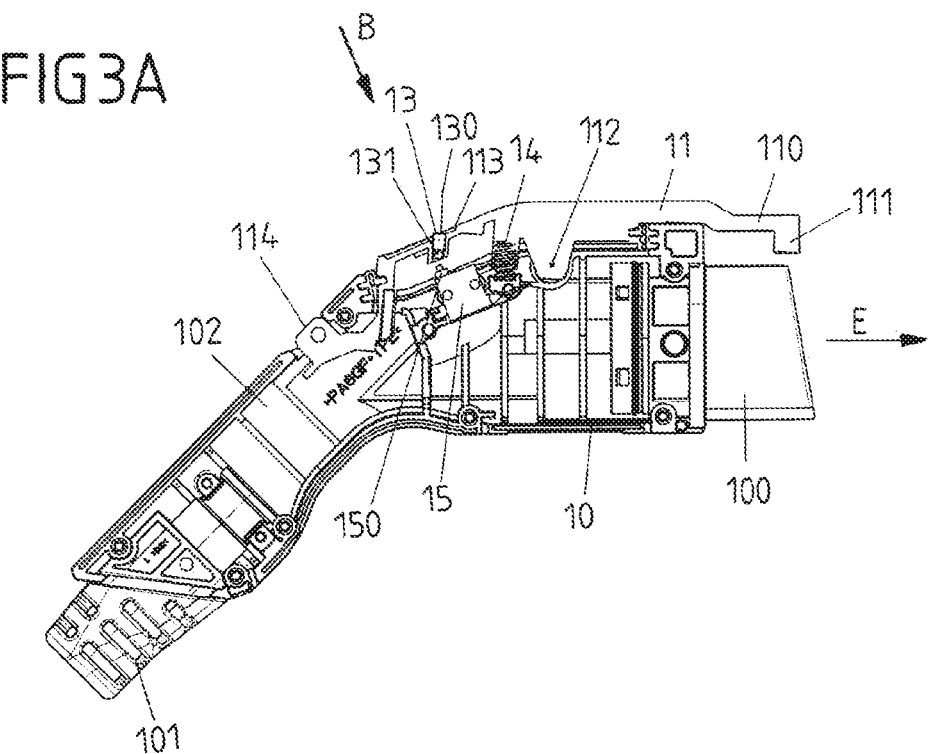
FIG. 3A is a partial view of the connector part, before an adjustment element is adjusted on a locking element of the connector part.

In an embodiment, the connector part comprises an adjustment element that is arranged on the locking element, can be adjusted relative to the locking element and is designed to act on the switch portion of the switch device when the locking element is moved.

An adjustment element is provided on the locking element and can be adjusted in order to calibrate the interaction of the locking element with the switch device. In this regard, the adjustment element is used to act on the switch portion of the switch device, for example a microswitch, and comes into contact with the switch portion when the locking element is actuated. In order to adjust the locking element to the switching point of the switch device in the process, the adjustment element can be moved relative to the locking element, thus making it possible to ensure that the switch device is reliably switched when the locking element is moved.

In particular, the locking element can be moveable between a locking position for locking the connection between the connector part and the mating connector part and an unlocking position for releasing the connection between the connector part and the mating connector part. In this case, the adjustment element can be designed to act on the switch portion when the locking element is moved toward the unlocking position. When the locking element is unlocked, the adjustment element thus comes into abutment with the switch portion of the switch device in order to switch the switch device. In the locking position, however, the adjustment element does not abut the switch portion, for example.

The switch device can, for example, be in the form of a mechanical switch device, e.g. a mechanical microswitch. Regardless of whether or not the adjustment element acts on the switch portion for the purpose of switching, the switch device can assume a first switching position or a second switching position, a control circuit, for example, being able to be controlled regardless of the switching position such that a current flows or does not flow over one or more contact elements of the connector part. A control circuit of this type can, for example, comprise a relay that is open or closed depending on the switching position of the switch device.

The adjustment element for acting on the switch portion can, for example, protrude from the locking element. In this case, the adjustment element acts on the switch portion of the switch device using its end that protrudes from the locking element by said end coming into contact with the switch portion when the locking element is moved toward the unlocking position and thus switching the switch device.

In one embodiment, the adjustment element can be in the form of a screw element that can be screwed relative to the locking element. The screw element is in threaded engagement with the locking element, and so the screw element is screwed into or out of the locking element when the screw element is twisted relative to the locking element. An adjustment element of this type can be made simply and cost-effectively, and, owing to its (self-locking) threaded engagement, allows for reliable fine adjustment of the switching point when the locking element is moved.

In an advantageous embodiment, the adjustment element can be adjusted relative to the locking element when in a calibration state. In the calibration state, the position of the adjustment element can be adjusted, i.e. relative to locking element, in order to thus calibrate the connector part to adjust the switching point of the switch device when the locking element is moved. A calibration of this type can, for example, be carried out during assembly, e.g. in the final check following assembly.

However, when the connector part is subsequently operated, there is generally no longer any need to move the adjustment element. Instead, it may be desirable to prevent such movement, particularly so as to prevent a user changing the calibration. For this purpose, once in an operative state, the adjustment element can be connected to the locking element, for example in an interlocking, frictional or integrally bonded manner, such that the adjustment element can no longer be moved relative to the locking element.

In an advantageous embodiment, when in the operative state, the adjustment element can for example be glued, soldered or welded to the locking element. For the gluing, a screw locking means can be used, for example, in which a glue, e.g. in the form of a gel, is injected into the region of the threaded engagement between the adjustment element (in the form of a screw element) and the locking element. This glue can, for example, cure in the presence of oxygen and under pressure and thus produce an integral bond between the adjustment element and the locking element that cannot be easily released by a user.

In one embodiment, the locking element is for example pivotally arranged on the housing. The locking element is thus mounted on the housing in the manner of a locking lever so as to be pivotable about a pivot pin. To move the locking element, the locking element can be moved relative to the housing in order to either engage a locking portion on a lever arm of the locking element with an associated locking portion on the mating connector part or to disengage said locking portion from said associated locking portion.

To act on the locking element, the locking element can, for example, comprise an actuation portion, by means of which a user can press the locking element in order to move it. By pressing on the actuation portion, the actuation portion is moved in an actuation direction in order to thus pivot or displace the locking element, for example.

The locking element can, for example, be pre-loaded with respect to the housing by means of a spring element. For example, the locking element can be pre-loaded toward its locking position such that the connector part and the mating connector part are automatically locked together when the connector part is plugged into the associated mating connector part.

The adjustment element can, for example, be arranged on the actuation portion of the locking element. When the locking element is moved over the actuation portion for unlocking the locking element, the adjustment element thus comes into abutment in the actuation direction with the switch portion of the switch device and thereby switches the switch device, it being possible to calibrate the switching point by adjusting the adjustment element when the locking element is moved.

In a starting position, the adjustment element is preferably accessible from the outside, i.e. from outside the housing, such that the adjustment element can be accessed for the purpose of adjustment for example using a suitable tool, e.g. a screwdriver. Once the adjustment is complete, and optionally once the adjustment element has been fixed in position relative to the locking element, a cap can then be placed on the locking element, such that the adjustment element is covered externally and is not accessible from the outside (anymore). The cap can, for example, be interlocked with the locking lever and is fixed in place on the locking element once it has been placed thereon.

For example, the adjustment element should (only) be able to be adjusted by the manufacturer during or after the assembly of the connector part. In this case, the cap can be glued to the locking lever, for example in the manner of a seal, such that the cap cannot be easily released by a user during subsequent operation and so a user cannot easily access the adjustment element.

A connector part of the type described here can, for example, be in the form of a charging plug or a charging socket for use as part of a charging system for an electrically operated vehicle (electric vehicle).

In an embodiment, the invention provides a method for calibrating a connector part to be connected to an associated mating connector part. The connector part comprises a housing having a plug-in portion that can be plugged into a mating plug-in portion of the mating connector part in an insertion direction and is connected to the mating plug-in portion when in a connection position, at least one electrical contact element arranged on the plug-in portion for electrically contacting the mating connector part when in the connection position, a locking element moveably arranged on the housing for interlocking the connector part with the mating connector part when in the connection position, and a switch device comprising a switch portion, which can be actuated when the locking element is moved, for controlling a current flowing over the at least one contact element.

In the process, in order to calibrate the connector part, an adjustment element arranged on the locking element is adjusted relative to the locking element for acting on the switch portion of the switch device when the locking element is moved.

The above-described advantages and advantageous embodiments of the connector part apply similarly to the method, and therefore reference should be made to these details above.

Calibration of the connector part by adjustment of the adjustment element can advantageously be carried out in a test apparatus provided therefor. Since the switch device having its switch portion is enclosed in the housing and thus it is not readily possible to see the position into which the adjustment element should be moved to allow it to act effectively on the switch device, the test apparatus can, for example, comprise a suitable display device, for example an optical display device, for displaying an adjustment status of the adjustment element. For example, an optical display device of this type can comprise one or more illuminating elements, e.g. in the form of LEDs.

For the purpose of calibration, the locking element is, for example, moved into a position in which the switch device should switch. The adjustment element is then adjusted such that the switch device is switched by means of the switch portion, and this can be displayed by the display device, which is connected to the switch device by means of a suitable controller, for example. In this case, the adjustment element can be adjusted by means of a suitable tool, for example a screwdriver, e.g. manually by a fitter.

If the adjustment element has been adjusted as desired in order to fix a suitable switching point for the switch device when the locking element is moved, the adjustment element can preferably be fixed in the position it then assumes, for example by the adjustment element being connected to the locking element in an interlocking, frictional or integrally bonded manner, e.g. by gluing, welding or soldering.

FIG. 1 to 5 are various views of an embodiment of a connector part 1 in the form of a charging plug, which can be used for example as part of a charging system for charging an electrically operated vehicle. The connector part 1 can, for example, be arranged on a charging cable and be connected to a charging station thereby.

The connector part 1 can be plugged into an associated connector part 2, for example in the form of a charging socket, by means of a plug-in portion 100 of a housing 10 in an insertion direction E, it being possible for said mating connector part 2 to be arranged on the vehicle, for example.

Figure 5:
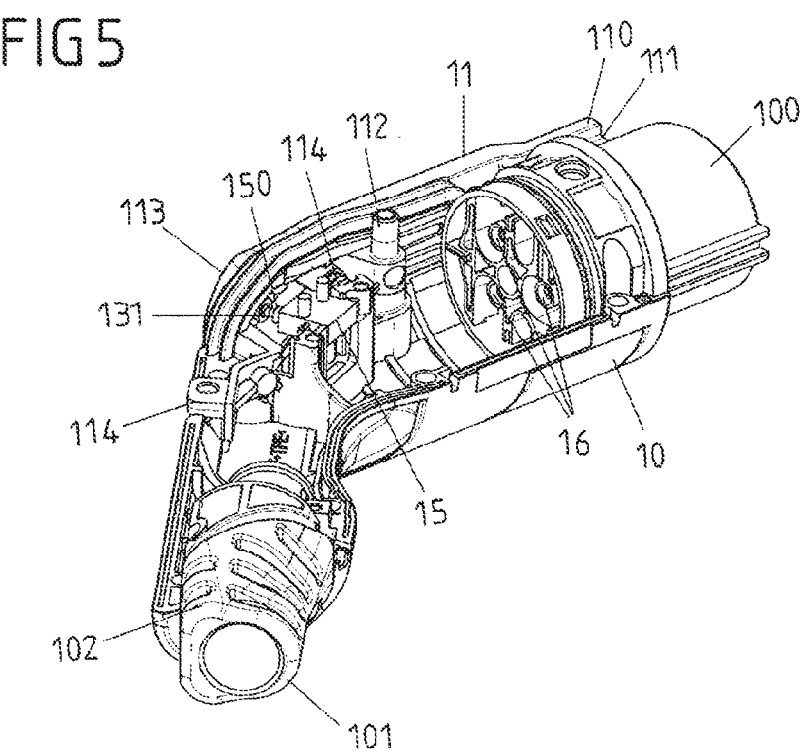
FIG. 5 is a partial view showing the inside of a housing of the connector part.

As can be seen from the partially cut-away perspective view according to FIG. 5, the plug-in portion 100 comprises a plurality of electrical contacts 16. By inserting the plug-in portion 100 in the insertion direction E into an insertion opening 20 in the associated mating connector part 2, the connector part 1 can be connected to the mating connector part 2, the electrical contacts 16 of the connector part 1 being electrically contacted with mating contact elements of the mating connector part 2 when in a connection position in which the plug-in portion 100 is inserted into the insertion opening 20.

Remote from the plug-in portion 100, the connector part 1 comprises a handle 102 for a user to grip, adjoining which is a cable outlet 101, via which a charging cable can be connected to the connector part 1.

A locking element 11 in the form of a pivotable locking lever is arranged on the housing 10. The locking element 11 is mounted on the housing 10 so as to be pivotable about a pivot pin 112 (see FIGS. 3A, 3B and 5), and can be pivoted relative to the housing 10 by pressing on an actuation portion 113 in an actuation direction B.

The locking element 11 can be moved between a locking position and an unlocking position. In the locking position, the locking element 11 is interlocked with an engagement lock 21 on the mating connector part 2 by means of a locking portion 111 on an end 110 facing the mating connector part 2, when the connector part 1 is inserted by its plug-in portion 100 into the associated engagement opening 20 in the mating connector part 2. To release the connection between the connector part 1 and the mating connector part 2, the locking element 11 can be moved from its locking position into its unlocking position, by a user pressing on the actuation portion 113 in the actuation direction B and the locking element 11 thus pivoting about the pivot pin 112 such that the locking portion 111 is disengaged from the engagement lock 21 on the mating connector part 2. The connector part 1 can thus be pulled out of the mating connector part 2 counter to the insertion direction E.

Figure 3B:
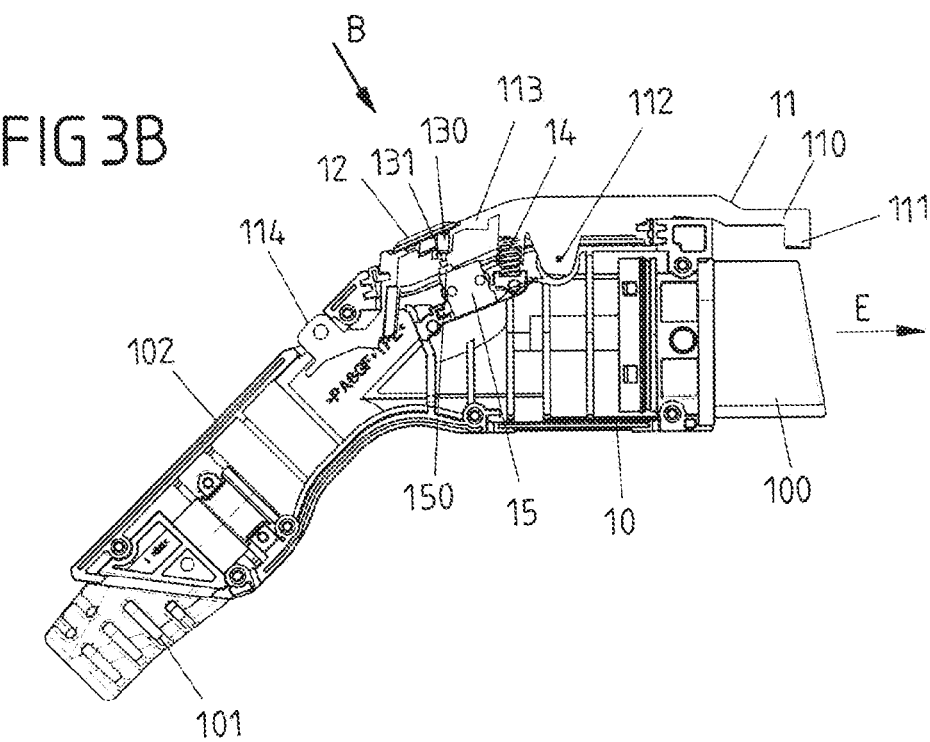
FIG. 3B is the sectional view according to FIG. 3A, after the adjustment element for acting on a switch device has been adjusted.

As can be seen from FIGS. 3A, 3B and 5, the locking element 11 is pre-loaded with respect to the housing 10 toward its locking position. This means that the locking element 11 can automatically lock with the mating connector part 2 when the connector part 1 is inserted into the mating connector part 2.

The locking element 11 is used in particular to prevent the connector part 1 being accidentally pulled out of the mating connector part 2 during a charging operation so that a charging process is not interrupted unintentionally. In this case, to block the locking element 11 in its locking position, the locking element 11 comprises a blocking portion 114 having an opening therein, through which a suitable securing element, for example a lock, can be inserted, such that the locking element 11 cannot be pivoted relative to the housing 10 in the actuation direction B when the securing element is attached.

As another security measure, a switch device 15 in the form of a mechanical microswitch is enclosed in the housing 10 and can be actuated by means of a switch portion 150 when the locking element 11 is unlocked. If the switch device 15 is switched when the locking element 11 is unlocked, a charging current over the contact elements 16 can be interrupted by means of a suitable control circuit (for example as described in DE 196 50 099 C2).

In the embodiment shown, an adjustment element 13 in the form of an adjustment screw is arranged on the locking element 11. The adjustment element is arranged in a hole 116 (see FIG. 4) in the locking element 11 and is in threaded engagement with the locking element 11 within the hole 116. By means of rotation, the adjustment element 13 in the form of the adjustment screw can thus be screwed into the locking element 11 or out of the locking element 11 in order to thus adjust the position of the adjustment element 13 relative to the locking element 11.

As can be seen from FIGS. 3B and 5, the function of the adjustment element 13 is to come into contact with the switch portion 150 of the switch device 15 when the locking element 11 is unlocked. If a user presses on the actuation portion 113, the locking element 11 is brought closer to the switch portion 150 of the switch device 15 by the adjustment element 13 arranged on the actuation portion 113, and comes into contact with the switch portion 150 such that the switch device 15 is switched.

By calibrating the adjustment element 13 appropriately, the switching point of the switch device 15 can be adjusted as desired, and so the switch device 15 switches as desired when the locking element 11 is moved toward the unlocked position.

As can be seen from FIGS. 3A and 3B, the adjustment element 13 is accessible from the outside via an end 130. Via another, opposite end 131, however, the adjustment element 13 can act on the switch portion 150 in order to thus switch the switch device 15.

Figure 6:
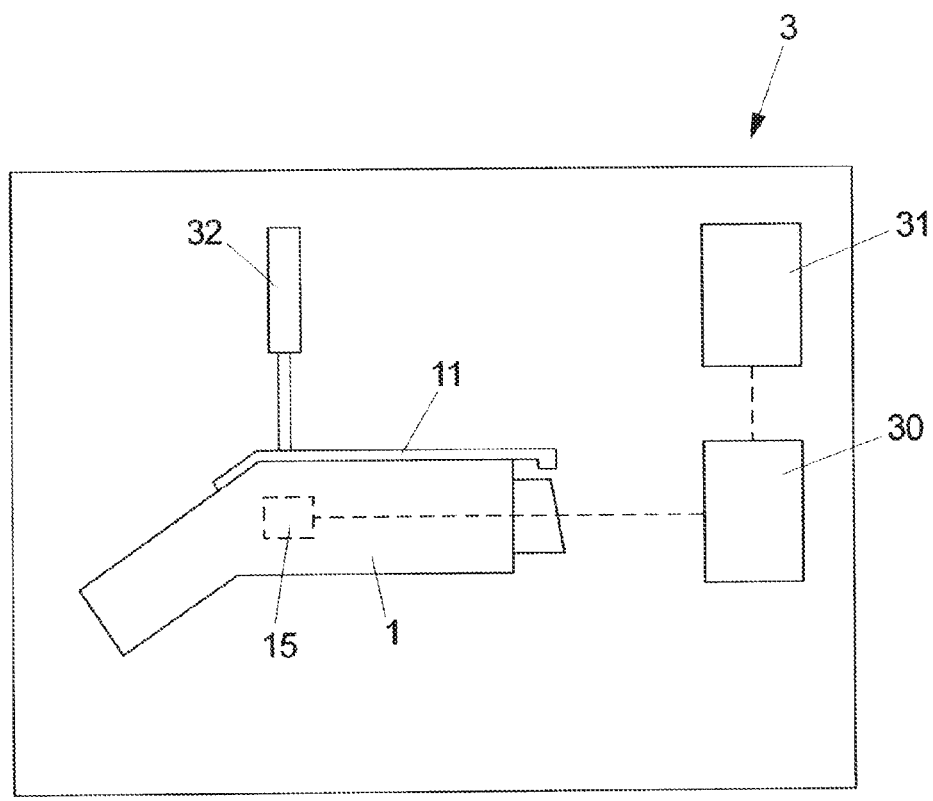
FIG. 6 is a schematic view of the connector part during calibration in a test apparatus.

The adjustment element 13 can, for example, be calibrated by a fitter during or (preferably) after assembly of the connector part 1, for example during a final check on the connector part 1. Tolerances of the individual interacting components in terms of position and dimensions can thus be balanced out. As shown schematically in FIG. 6, the calibration can be carried out within a test apparatus 3 by a fitter operating the adjustment element 13 using a tool 32, for example in the form of a screwdriver, and rotating said element to adjust its position. For this purpose, the locking element 11 is moved into a position in which the switch device 15 should switch. The switch device 15 is connected to a controller 30 and to a display device 31 thereby, the controller 30 being designed to evaluate whether the switch device 15 switches, and the display device 31 displaying, for example visually, e.g. by means of an illuminating element or the like, whether a switching operation is detected at the switch device 15.

If the locking element 11 is in a position in which the switch device 15 should switch, and the adjustment element 13 is now screwed into the locking element 11 until the switch device switches 15, as can be seen in the transition between FIGS. 3A and 3B, the connector part 1 is correctly calibrated, which the fitter can easily see via the display device 31.

If the calibration is complete, the adjustment element 13 in the form of the adjustment screw can advantageously be fixed in place relative to the locking element 11. For this purpose, for example a suitable screw locking means can be used, e.g. using a (for example single-component) adhesive in liquid or semi-solid form that cures at room temperature. When the adhesive flows into gaps in the threaded engagement between the adjustment element 13 and the thread of the hole 116 in the locking element 11 and cures, the adjustment element 13 is fixed in place in an integrally bonded manner and cannot be easily adjusted again later by a user. Therefore, following assembly, this calibration cannot be easily changed by a user during operation.

The locking element 11 can, for example, be in the form of a zinc die-cast part.

Figure 4:
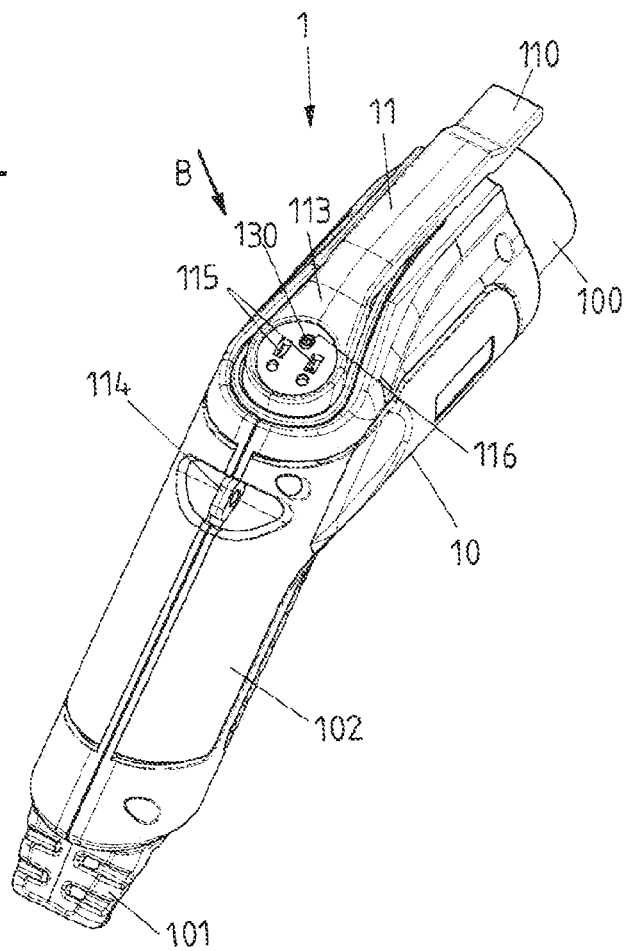
FIG. 4 is a perspective view of the connector part, without a cap placed on an actuation portion of a locking element.

Lastly, to cover the adjustment element 13 externally, a cap 12 (see FIGS. 1 and 3B) can be placed on the actuation portion 113, and can be interlocked with the locking element 11 via engagement openings 115 (see FIG. 4). By means of the cap 12, the adjustment element 13 is thus hidden externally, and so a user cannot easily access the adjustment element 13 from the outside.

In addition or alternatively to the interlocking connection, the cap 12 can also be glued to the locking element 11 in the manner of a seal.

The idea behind the invention is not limited to the embodiments described above, but can in principle also be implemented in a completely different manner.

In particular, a connector part of the type described here is not limited to a charging plug. Fundamentally, the invention can also be used in completely different connector parts. The connector part can, for example, also be designed as a socket.

In addition, the connector part can also be used for purposes other than charging devices.

In principle, the locking element can be arranged on the housing in a pivotable or displaceable manner, or so as to be moveable in any other way.

The switch device can, for example, be in the form of a mechanical microswitch. However, this should not be taken as limiting. In principle, any other switch devices that change their switch state when the locking element is moved are conceivable and possible.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Connector part
10 Housing
100 Plug-in portion
101 Cable outlet
102 Handle
11 Locking element
110 End
111 Locking portion
112 Pivot pin
113 Actuation portion 114 Blocking portion
115 Engagement openings
116 Hole
12 Cap
13 Adjustment element
130, 131 End
14 Spring element
15 Microswitch
150 Switch portion
16 Contact element
2 Mating connector part
20 Plug socket
21 Engagement lock
3 Test apparatus
30 Controller
31 Display device
32 Adjustment tool
B Actuation direction
E Insertion direction

What is claimed is:

1. A connector part to be connected to an associated mating connector part, the connector part comprising:
   a housing having a plug-in portion configured to be plugged into a mating plug-in portion of the mating connector part in an insertion direction and configured to be connected to the mating plug-in portion when in a connection position;
   at least one electrical contact element arranged on the plug-in portion, the at least one electrical contact element being configured to electrically contact the mating connector part when in the connection position;
   a locking element moveably arranged on the housing, the locking element being configured to interlock the connector part with the mating connector part when in the connection position;
   a switch device that comprises a switch portion that is configured to be actuated when the locking element is moved to control a current flowing over the at least one contact element; and
   an adjustment element arranged on the locking element, the adjustment element being configured to be adjusted relative to the locking element and to act on the switch portion of the switch device when the locking element is moved.

2. The connector part according to claim 1, wherein the locking element is configured to move between a locking position for locking the connection between the connector part and the mating connector part and an unlocking position for releasing the connection between the connector part and the mating connector part.

3. The connector part according to claim 2, wherein the adjustment element is configured to act on the switch portion when the locking element is moved toward the unlocking position.

4. The connector part according to claim 1, wherein the adjustment element for acting on the switch portion protrudes from the locking element.

5. The connector part according to claim 1, wherein the adjustment element comprises a screw element that is in threaded engagement with the locking element and that is configured to rotate relative to the locking element.

6. The connector part according to claim 1, wherein the adjustment element is configured to be adjusted relative to the locking element when in a calibration state and is rigidly connected to the locking element when in an operative state.

7. The connector part according to claim 6, wherein the adjustment element is glued, soldered or welded to the locking element when in the operative state.

8. The connector part according to claim 1, wherein the locking element is pivotally arranged on the housing.

9. The connector part according to claim 1, wherein the locking element comprises an actuation portion by which the locking element is configured to be actuated and by which the locking element is configured to be moved relative to the housing in an actuation direction.

10. The connector part according to claim 9, wherein the adjustment element is arranged on the actuation portion.

11. The connector part according to claim 1, further comprising a cap arranged on the locking element, the cap being configured to cover the adjustment element.

12. A method for calibrating a connector part to be connected to an associated mating connector part, the connector part comprising:
    a housing having a plug-in portion configured to be plugged into a mating plug-in portion of the mating connector part in an insertion direction and configured to be connected to the mating plug-in portion when in a connection position;
    at least one electrical contact element arranged on the plug-in portion, the at least one electrical contact element being configured to electrically contact the mating connector part when in the connection position;
    a locking element moveably arranged on the housing, the locking element being configured to interlock the connector part with the mating connector part when in the connection position; and
    a switch device that comprises a switch portion that is configured to be actuated when the locking element is moved to control a current flowing over the at least one contact element;
    the method comprising:
    providing an adjustment element arranged on the locking element, the adjustment element being configured to act on the switch portion of the switch device when the locking element is moved, and
    adjusting the adjustment element relative to the locking element so as to calibrate the connecting part.

13. The method according to claim 12, wherein the calibrating is carried out using a test apparatus having a display device configured to display an adjustment status of the adjustment element.

14. The method according to claim 12, wherein a position of the adjustment element relative to the locking element is fixed following the calibrating.

* * * * *